B. C. STICKNEY.
COMBINED TYPE WRITING AND COMPUTING MACHINE.
APPLICATION FILED MAR. 18, 1912.
1,185,143.
Patented May 30, 1916.
7 SHEETS—SHEET 1.
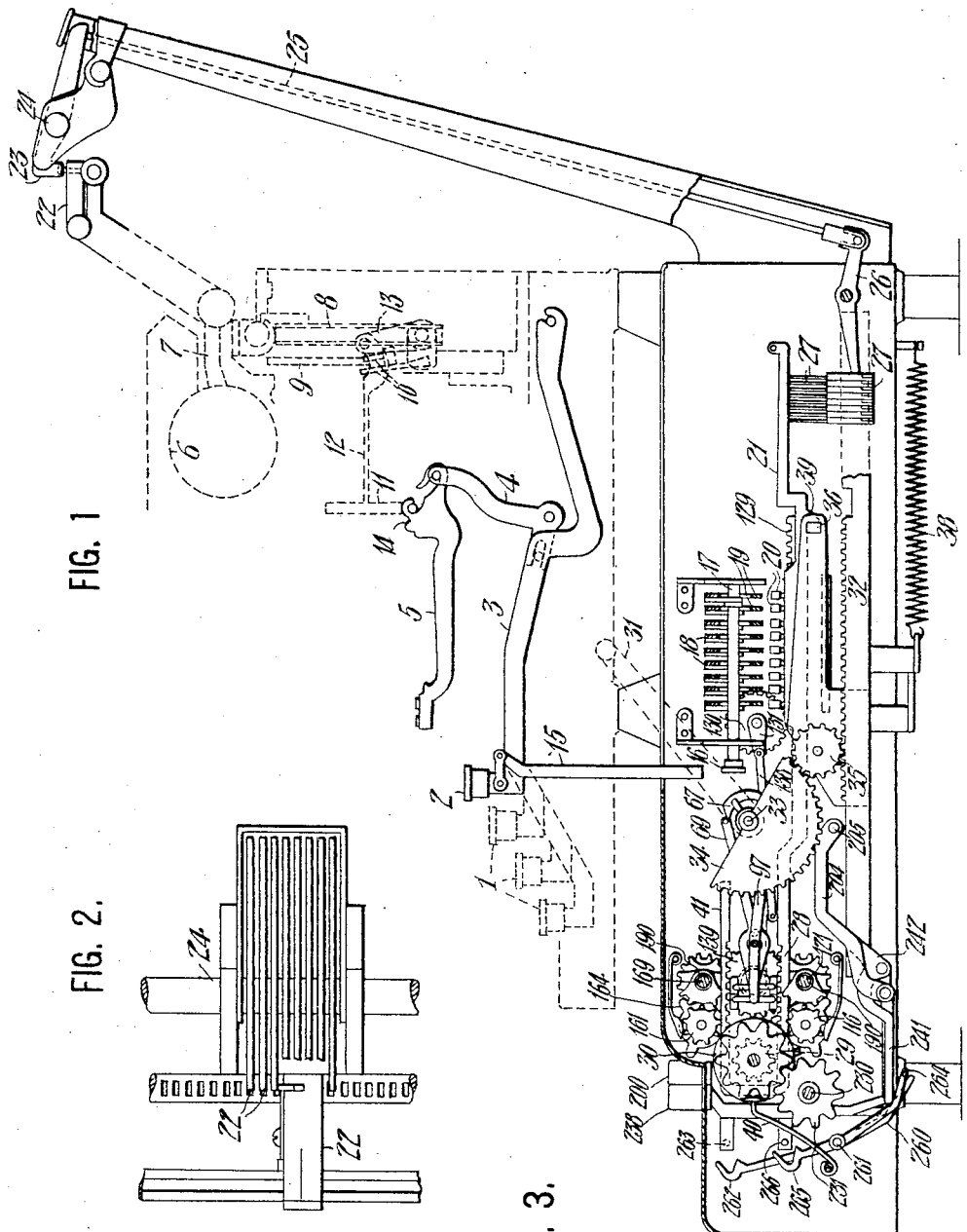
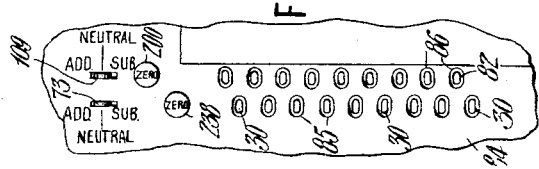

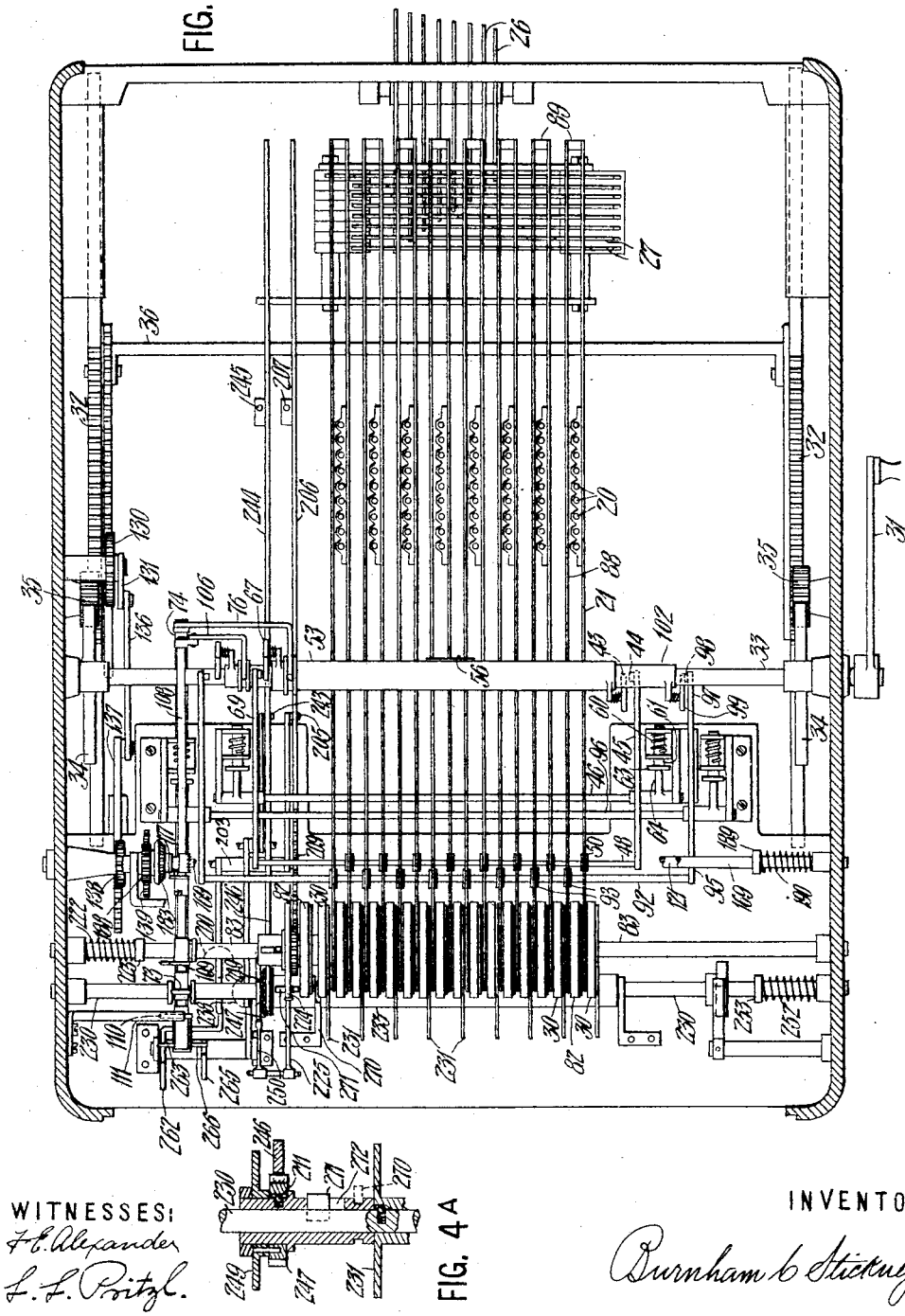

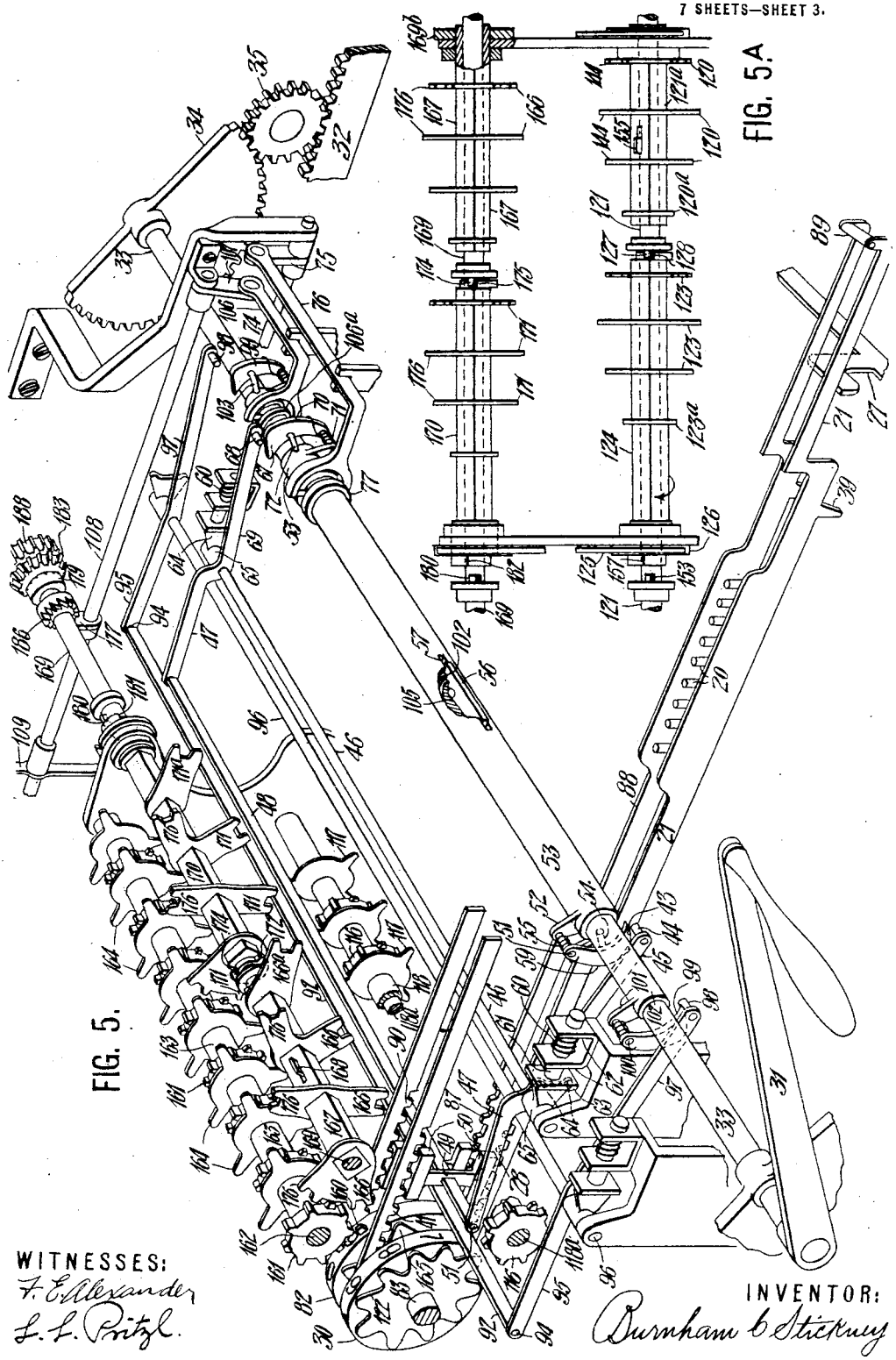

B. C. STICKNEY.
COMBINED TYPE WRITING AND COMPUTING MACHINE.
APPLICATION FILED MAR. 18, 1912.
1,185,143.
Patented May 30, 1916.
7 SHEETS—SHEET 4.
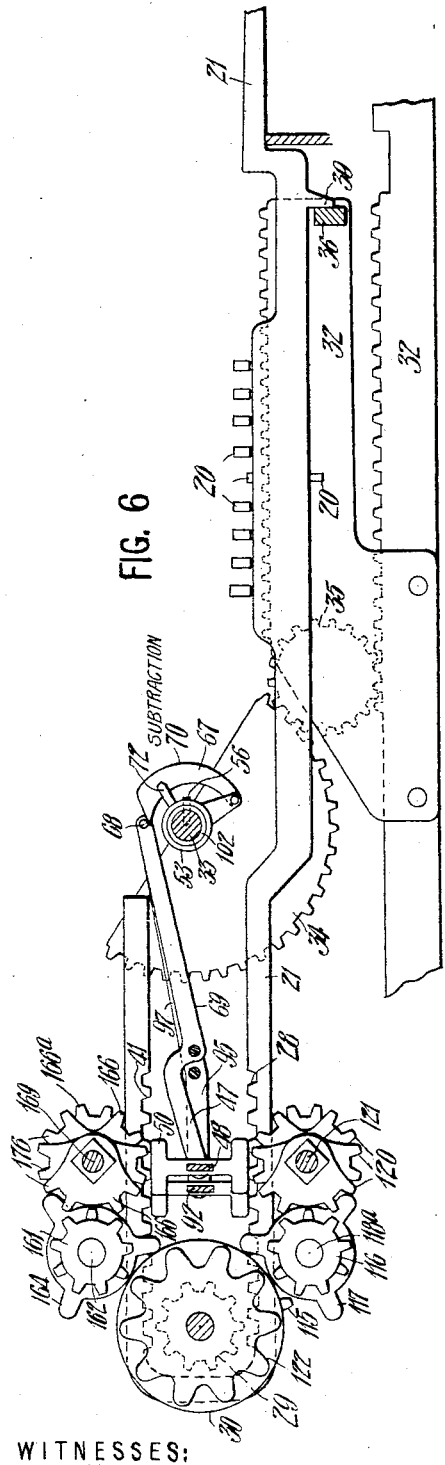
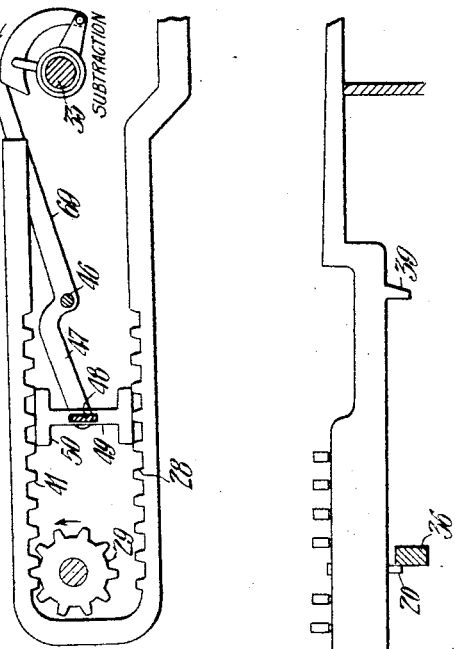
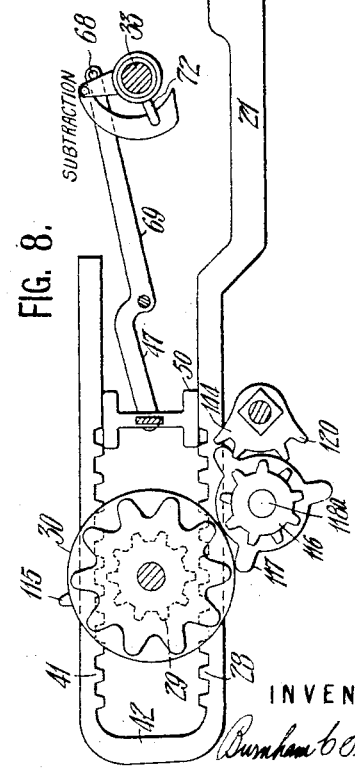
WITNESSES:
INVENTOR:

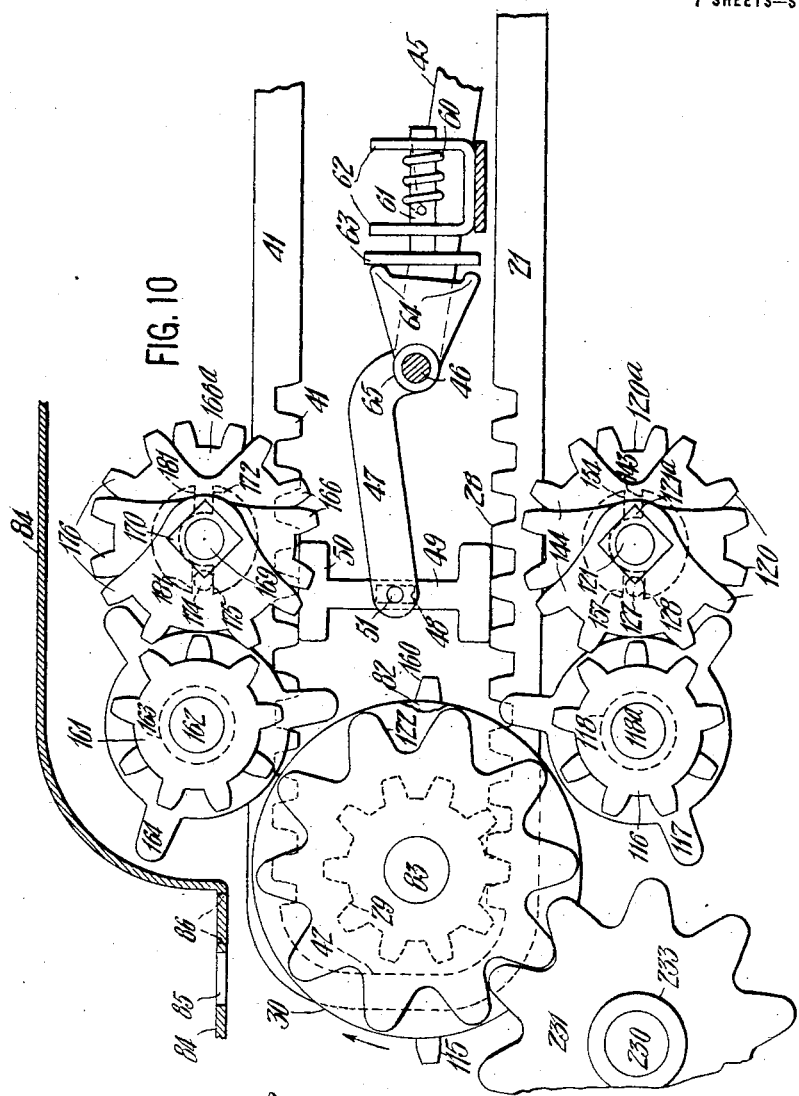

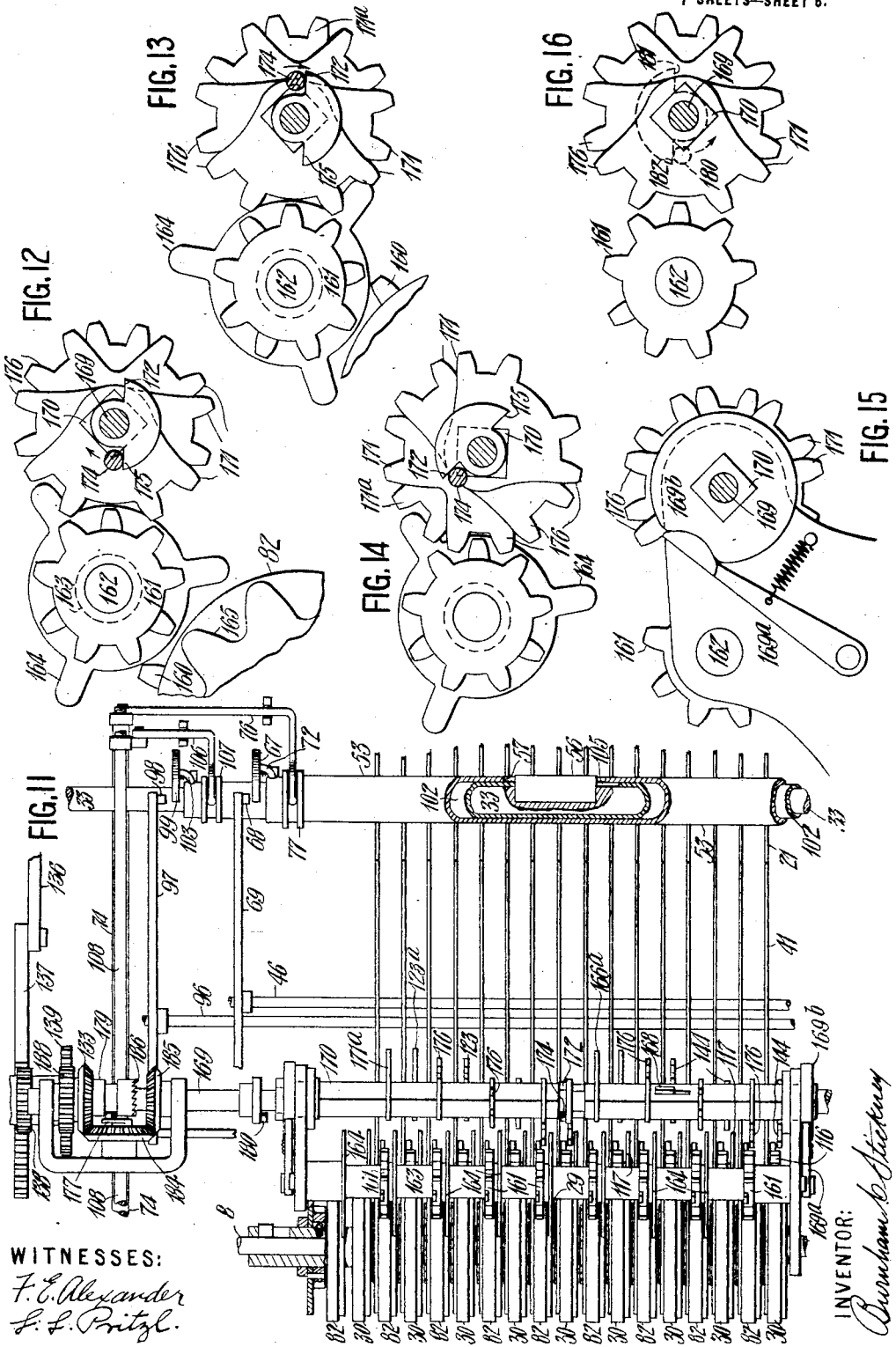

B. C. STICKNEY.
COMBINED TYPE WRITING AND COMPUTING MACHINE.
APPLICATION FILED MAR. 18, 1912.
1,185,143.
Patented May 30, 1916.
7 SHEETS—SHEET 7.
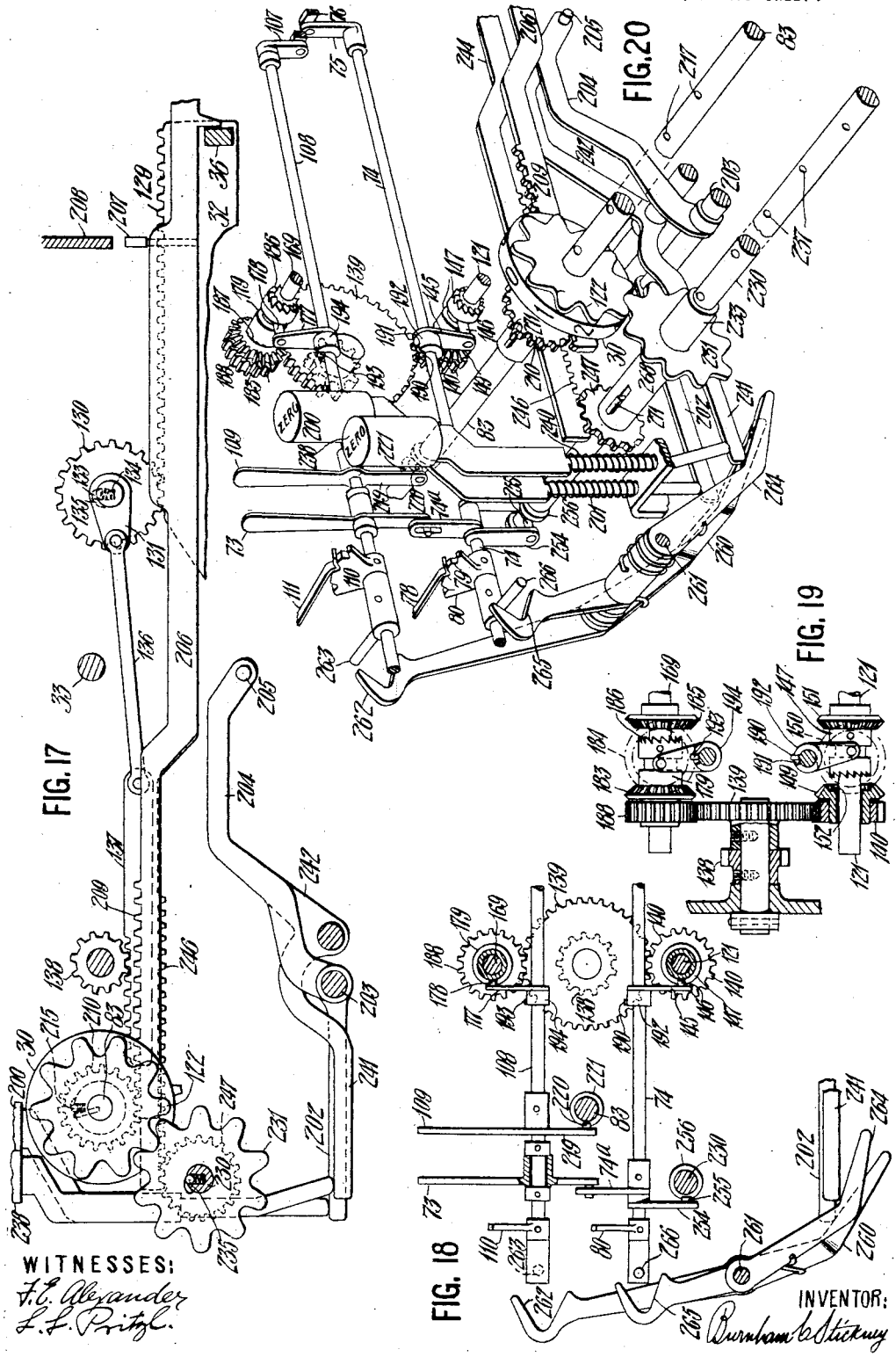
WITNESSES:
F. C. Alexander
L. F. Pritzl
INVENTOR:
Burnham C. Stickney

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,185,143.   Specification of Letters Patent.   Patented May 30, 1916.

Application filed March 18, 1912. Serial No. 684,499.

*To all whom it may concern:*

Be it known that I, BURNHAM C. STICKNEY, a citizen of the United States, residing in Elizabeth, in the county of Union and State of New Jersey, have invented certain new and useful Improvements in Combined Type-Writing and Computing Machines, of which the following is a specification.

This invention relates principally to computing machines of the kind in which computation pins are set up by means of numeral keys, and in which a general operator is then called into action to rotate the wheels, each to an extent dependent upon its associated pin.

One of the principal features of the present improvement relates to machines in which a plurality of sets of computing wheels is controllable by a single system of key-set pins; this feature of the invention making it practicable to silence either set of wheels while addition is performed upon the other set, or else to perform addition simultaneously upon both sets. To carry out this feature of the invention, I employ one computation-bar for each of the wheels, and divide the system of computation bars into pairs, and I connect the bars in each pair together, preferably by pivoting one to the other. All the bars may be normally out of mesh with the computation wheels, and either set of bars may be moved independently of the other set into mesh with its associated wheels, to perform addition thereon, while nothing is accomplished by the other set of bars. The computation wheels of the two sets are interjacent, as disclosed in my pending application No. 658,134, filed November 2, 1911, and the bars in each pair or couple are associated one with a wheel in one set, and one with a wheel in the other set. Only a single system of computation-pins is used for all the bars; the pins being divided into rows, one row for each pair of bars, so that when the bars are advanced, the wheels in both sets may be rotated the same distance, or, if desired, one set may remain idle while addition is performed upon the other set.

Provision is also made for effecting subtraction upon either set of wheels while the other set is either performing addition, or performing subtraction, or silenced, as may be desired. Each computation bar in each pair has preferably two racks, one for addition, and one for subtraction, both racks being normally out of mesh with the associated computation pinions, either bar being movable independently of the other, to cause either one or the other of its racks to mesh with its pinion, according to whether addition or subtraction is desired.

Each set of computing wheels is provided with its own carry-over trains, and each set of trains has means for either subtracting or adding. Preferably, two finger-pieces are provided, one for each set of computing wheels, each finger-piece being movable independently of the other to position for either addition or subtraction, or to a neutral position; means being connected to said finger-pieces for controlling the shifting of all the racks connected with the associated set of computing or dial wheels. Provision is also made whereby the general operator of the machine may be caused to return the wheels in either set to zero independently of the other set.

Still other features and advantages will hereinafter appear.

In the accompanying drawings, Figure 1 is a sectional elevation taken from front to rear, showing an Underwood-Hanson combined typewriting and computing machine embodying the present improvements, the parts shown in normal positions. Fig. 2 is a plan of the usual denomination jacks and the carriage dog which operates them successively during the letter feeding movement of the paper carriage of the typewriter. Fig. 3 is a fragmentary plan of the forward portion of the casing of the computing mechanism, showing two rows of sight openings for the dial wheels, etc. Fig. 4 is a sectional plan of the computing mechanism. Fig. 4$^A$ is a sectional detail of a zeroizing arbor and connections whereby it is driven. Fig. 5 is a perspective rear view of certain portions of the computing mechanism, especially the tens carrying trains and also the shiftable devices for determining whether either adding head shall add, subtract or remain neutral; all the parts being shown in normal positions. Fig. 5$^A$ is a part sectional front elevation of upper and lower sets of power spurs for operating the carry over trains. Fig. 6 is a sectional elevation illustrating the normal position of a subtraction cam, and also showing dial wheels, operating racks, tens carrying trains, etc. Fig. 7 illustrates the method by which the subtraction racks are thrown into engagement with their pinions. Fig. 8 shows the condition of the mechanism at the conclusion of the forward stroke of the general operator, illustrating how the racks spring out of connection with the pinions at the conclusion of such stroke. Fig. 9 is an enlarged sectional front elevation of the computing dial wheels and connections. Fig. 10 is a side elevation of the same. Fig. 11 is a plan showing the shiftable means for determining whether the computing heads shall add or subtract, etc., the parts being shown in position for addition. Figs. 12 to 16 illustrate the different positions of one of the carry-over mechanisms. Fig. 17 illustrates the power driven mechanism for driving the spurs which operate the carry-over trains. Fig. 18 is also a sectional side elevation showing the handles or finger pieces which control the operation of the different sets of computing wheels. Fig. 19 is a front sectional elevation showing the devices seen at Fig. 18. Figure 20 is a front perspective view of the same devices.

In said machine, alphabet keys 1 and numeral keys 2 depress levers 3 to operate bell cranks 4, to swing type bars 5 up to strike against the front of a platen 6, which is mounted on a carriage 7, propelled by a spring barrel 8 and controlled by an escapement wheel 9 and dogs 10, the latter operated by a universal bar 11 mounted on a reciprocating frame 12, which is carried at its rear end by idle links 13; said universal bar being operated by heels 14 on the type bars. Said numeral keys have stems 15 to depress arms 16 on rock shafts 17, which form parts of linkages 18; said linkages also including horizontal depressible bars 19, which extend horizontally across the machine to enable the keys to depress any of a nest of computation pins 20. Said pins 20 are carried upon bars 21, which operate all the dial wheels in one set; there being one bar 21 for each denomination.

The carriage of the typewriter selects or determines the denomination in which computing is to be done upon the depression of any numeral key. For this purpose, the carriage carries a dog 22 to engage and cam up or lift any of a series of jacks 23, which are pivoted at 24, and at their rear ends depress rods 25, the latter connected by levers 26 to linkages 27 which lift the rear ends of the bars 21; each jack 23 being connected with its own bar 21, so that the position of the carriage 7 determines which one of said bars 21 shall lie in elevated position at the depression of any numeral key 2. At their forward ends, the bars 21 have racks 28 to engage pinions 29, which are fixed to their respective dial wheels 30.

A general operator is driven by a crank 31 or otherwise, and comprises a pair of racks 32, to which a shaft 33 is connected by segments 34 fixed on said shaft, idle pinions 35 intervening between said segments and said racks 32. The racks are connected by a horizontal cross bar 36. The bar 36, as usual, engages any of the pins 20 which have been depressed by the keys; and accordingly the racks are driven forward and the computing wheels rotated. The return movement of the general operator may be caused or assisted by a spring 38, Fig. 1; and the cross bar 36 of the general operator may engage lugs 39 pendent from the bars 21, to drive the latter backward to normal positions; all the dial wheels remaining motionless while this is done, being held by spring detents 40, Fig. 1. Also carried upon the forward end of each bar 21 is a rack 41 to be used for subtraction; this rack being parallel with the rack 28 and overlying the pinion 29, but adapted to drop into engagement with said pinion, so as to turn the pinion in reverse direction at the forward stroke of the bar 21 effected by the forward stroke of the general operator bar 36. The racks may be connected in any suitable way, as for instance by means of a yoke 42, which may be integral with the racks.

Both racks 28 and 41 stand normally out of engagement with the dial-wheel pinion 29. At the start of the general operating handle 31, the rack 28 may be swung up into engagement with said pinion. For this purpose, there is provided a cam 43, Fig. 5, to engage a pin or roller 44 on an arm 45 which extends back from a horizontal transverse rock shaft 46; arms 47 extending forwardly from said shaft, and carrying at their forward ends a shifting and guiding bar 48. The cam 43 has similar construction and operation to the cam shown in my pending application No. 668,822, filed January 2, 1912; and the same is true of certain other features of the adding and subtracting mechanism herein set forth.

It will be perceived that the cross bar 36 of the general operator is placed far back of the computation pins 20, so that considerable advance movement of said general operator may occur before said cross bar 36 can engage any pin; and it is during this idle advancing movement, that the cam 43 is rotated by the general operator shaft 33 sufficiently to vibrate the frame 45, 46, 47, and lift the addition racks 28 into mesh with the computation pinions 29.

The transverse rack-controlling bar 48 has, at intervals, vertical cross heads 49 carrying at their upper and lower ends blocks or shoes 50 to engage the upper and lower racks 41, 28, and control the positions thereof; said bar 48 being swiveled at 51 to the opposite arms 47 of the rack-controlling frame. Each shoe 50 extends sufficiently far along the racks to be guided thereby and always maintained in a vertical position.

Only half of the racks shown in the drawings are controlled by the transverse bar 48, but owing to the separation of the upper and lower racks in all cases, said bar 48 has room to swing up and down, regardless of the positions of those racks which are not controlled thereby. The cross heads 49 may be placed on the bar 48 at intervals to correspond with the positions of the racks 28, 41, while permitting the remaining racks to be controlled in a similar manner, as will presently be explained.

Continued motion of the handle 31 in forward direction causes the general operator 32 to advance, and the bar 36 thereon to engage the depressed pins 20 to advance the racks 28 and rotate the pinions 29 and dial wheels 30 for addition. As has been explained, the initial portion of the movement of the handle 31 is used for depressing the pin 44 by means of the cam 43. Said cam is in the form of a pawl which is pivoted to an arm 52, which projects from a sleeve or hollow shaft 53, which is loosely mounted upon or supported by said driving shaft 33; and the pawl has a foot 54 to rest on said sleeve 53, and is pressed toward said sleeve by a spring 55. A bit or key 56 projects from the driving shaft or crank axle 33 into a slot 57 in said sleeve 53, whereby the latter is caused to turn with the crank. By the advancement of the racks 21, the dial wheels 30 of one set are turned to various extents determined by the pins 20 that have been depressed by the keys.

It will be seen that the cam 43 merges into a curved edge 59 which is concentric with the axle 33, and that the roller or pin 44 is maintained motionless in its depressed position until the forward stroke of the general operator 32 is practically completed, so that the racks 28 are held in mesh with the pinions 29 during said forward stroke of the general operator. At the final portion of said forward stroke, the pin or roller 44 drops off from the end of the edge 59, and the parts 45, 47, 48 forming the rack controlling frame are returned to normal positions by spring 60, to permit the racks to be driven back to normal position while the pinions 29 remain motionless.

There may be two springs 60, one at each end of the rack-controlling frame 45, 47, 48. Said springs coil around stems 61, which are guided horizontally in brackets 62, and carry at their forward ends heads 63 to engage double cams 64, the latter having hubs 65 fixed to the shaft 46. The cams 64, in each instance, are placed one below and one above the shaft or pivot 46, so that the springs 60 may return the racks to midway normal positions after they have been either elevated or depressed into engagement with the pinions.

The pin 44 having snapped off from the high or dwell portion 59 of the cam, and the spring 60 having restored the rack-shifting frame to its normal or midway position, the crank 31 is now pushed back to normal position. During this operation, the drive axle turns backwardly, and the hollow shaft or sleeve 53 is also turned backwardly by the bit 56. The pin 44 passes inside the cam member or pawl 43, 59, which yields upon its pivot 51 to permit the pawl to slip past the pin or roller 44. When the pin 44 passes by, the spring 55 snaps the pawl again toward the sleeve 53 with its foot 54 resting upon said sleeve; said foot being placed at one side of the pawl so as to give clearance to the pin or roll 44.

The setting of the machine for subtraction involves shifting of the cam-carrying sleeve 53 endwise along the shaft 33 from the Fig. 5 position to the Fig. 4 position, to silence the cam 43 by shifting it out of its position, so that it cannot engage the wrist 44. At the same time, an oppositely placed cam 67 on the other end of the sleeve 53 is shifted into position to engage a pin or roll 68 carried upon an arm 69 at the other side of the shifting frame from the arm 45. Arm 69 is adapted to be raised by said cam 67 during the starting of the handle 31, so as to depress the arms 47 and shifter bar 48, and bring the top racks 41 down into mesh with the computation pinions 29, so that the latter may turn backwardly during the final stroke of the general operator 32, during which time the roll 68 runs upon a curved edge 70 concentric with the axle 33, to hold the racks in mesh with the pinions. At the conclusion of the stroke, the pin 68 drops off from the end of the cam pawl 67, 70, permitting springs 60 to lift the racks to normal midway positions in advance of the return of the racks effected by the general operator 32 at the return stroke of the handle 31. During such return stroke, the cam pawl 67, 70, rides past the projection 68, and is snapped into normal position by a spring 71 with its foot 72, Fig. 5, resting upon the sleeve 53. Thus it will be seen that the racks mesh with the pinions only during their initial strokes, and are out of mesh with the pinions during their return strokes.

The above described mechanism may be set for either addition or subtraction by means of a handle 73 which is seen at Figs. 3 and 20 in neutral position. This handle is connected to an arm 74ª fixed upon a horizontal rock shaft 74 extending rearwardly, and carrying at its rear end an upstanding arm 75 connected by a shifting link 76 and a circumferentially grooved shifting collar 77, to the sleeve 53, the shifting collar being fixed on said sleeve; the link having a pair of opposed pins to engage the groove in said shifting collar.

A detent spring 78, Fig. 20, engages any one of three notches 79 in a plate 80 fixed on the shaft 74, to hold the latter in either addition position or subtraction position, or in midway neutral position; and the cover plate 84 of the computing machine base may be provided with appropriate directions, as at Fig. 3. When the handle is in the neutral position seen at Figs. 3 and 20, the dial wheels 30 will not rotate during the movement of the general operator, even though the racks 21 are carried forward by the cross bar 36, since none of the racks will engage the pinions 29 associated with the dial wheels 30.

Two complete sets of interjacent dial wheels are shown at Fig. 11, those in one set being marked 30, and those in the other set 82; the wheels in both sets being loose upon an arbor 83.

At Fig. 3 is illustrated a method by which readings can be taken from both sets of wheels, as explained in my pending application No. 658,134, filed November 2, 1911. There is a cover plate 84 for the wheels; said plate having two rows of individual sight openings, the lower row of openings being marked 85, through which may be read the number on the wheels 30. The upper row is marked 86, and discloses the numbers on the wheels 82.

At Fig. 3 all of the wheels are shown in zero positions, and it will be seen that the zeros on the wheels have staggered relation; on in other words, the zeros on the wheels 82 are advanced beyond the zeros on the wheels 30.

The wheels 82, composing the second set, are driven by racks 87 formed on bars 88, one of the latter being connected by a pivot 89 to each of the bars 21, and being similar thereto, except that it is not provided with any pins 20. Each of the pivots or pins 89 connects its pair of bars preferably at their rear extremities, either bar being readily swung up or down to connect either its lower rack or its upper rack to the associated pinion. The upper rack on the bar 88 is designated as 90; and the associated pinion on the wheel 82 is designated as 91. The single set of pins 20 is capable, therefore, of rotating simultaneously the wheels 30, 82; or if desired it may rotate only one wheel, leaving the other one stationary. While either wheel is stationary the other wheel may be rotated either forwardly or backwardly, or, if desired, either wheel may be rotated in one direction, while the other wheel is at the same time rotated in the reverse direction. Thus a single setting of the computation pins may serve in effecting both addition and subtraction of the same number on different adding heads, or in effecting simultaneous addition on said adding heads, or subtraction on said adding heads, or either addition or subtraction on either adding head, while the other remains silent.

The racks 87, 90 of the second set are shifted by means of a bar 92 forward of the shifter bar 48 and having cross heads 93 between the racks 87, 90, similar to the cross heads 49 on shifter bar 48. The shifter bar 92 is pivoted at its ends at 94 on arms 95, corresponding to the arms 47 and extending forwardly from a rock shaft 96, which is journaled at its ends in the framework. From rocking frame 92, 95, 96, extend rearwardly arms 97 corresponding to arms 45 and 69, and having pins 98 corresponding to pins 44 and 68, and engageable by pawls 99. These pawls are similar to pawls 59 and 67 and are pivoted at 100 upon arms 101 provided upon the ends of a rocking sleeve 102, which is loosely mounted upon the shaft 33 and is surrounded by the sleeve 53; said pawls having rests or feet 103 and springs 104 for the same purpose as the corresponding devices shown upon pawls 59. The sleeve 102 has a slot 105 through which extends the same key or pin 56 that rotates the outer sleeve 53. The operation of the shifter bar 92 is the same as that of the shifter bar 48; the sleeve 102 being shifted endwise independently of the pin 56, and also independently of the sleeve 53, this endwise shifting of sleeve 102 being effected by a shifting link 106, engaging a collar 106ᵃ on sleeve 102, and connected to a depending arm 107 on rock shaft 108. The latter has fixed to its forward end a handle 109, just back of the handle 73 and also projecting above the cover plate 84, Figs. 3 and 20. Handle 73 is loose on shaft 108. This shaft 108 is also provided with a three-notched plate 110, engageable by a detent spring 111; these parts corresponding to parts 78, 79, 80. The handles 73 and 109 are shown in their neutral or midway positions at Figs. 3 and 20.

From the foregoing it will be seen that in order to cause either computing head or set of wheels to add or to subtract, or to remain neutral, while the other computing head or set is either adding or subtracting, or remaining neutral, it is only necessary to attend to the adjustment of the handles 73 and 109.

Referring now to the dial or computing wheels 30, it will be seen that each one thereof has a starting tooth 115, Fig. 10, projecting from its periphery to engage and start a pinion 116, which, with a three-toothed wheel 117 fixed thereto, forms a train for carrying tens to the wheel 30 of next higher denomination; each pinion 116 being connected to its three-toothed wheel 117 by a hub 118, Fig. 5, which is elongated to pass by the intervening dial wheel 82 of the other set; tens being either carried or borrowed from wheel to wheel upon one set of dial wheels independently of the other set of dial wheels, thereby permitting accumulation on one set, whenever desired, of the results of all of the computations performed upon the other set. The hubs 118 are loosely mounted on an arbor 118ª. The wheels in either set may be returned to zero without disturbing those in the other set, and from that point new members can be either added or subtracted concomitantly on both sets, thus giving on one set the aggregate of all the computations performed upon the other set. Subtraction may be performed upon either set while the other set is either adding, subtracting or silenced. The pinion 116 is moved by the tooth 115 as the wheel 30 turns from "9" to "0", and a broad tooth 119 upon said pinion is brought into the path of a sector or driving tooth 120 fixed upon a sleeve 121ª, which is mounted upon a shaft 121, and splined (as at 168) to rotate therewith. Said shaft 121 is operated by the general operator aforesaid, during the return stroke of the latter.

It will be understood that the starting teeth 115 on the computing wheels 30 operate only during the forward stroke of the general operator, thereby turning the pinions 116 to positions to be engaged by the segments 120; and the latter are spirally placed upon the sleeves 121ª and 124 on shaft 121, as seen at Fig. 5ᴬ (in the manner illustrated in perspective at Fig. 5) so that one tens-carrying train is fully operated before the pinion 116 of the succeeding tens-carrying train can be engaged or operated by the succeeding segment 120. Thus tens are carried or borrowed from wheel to wheel along the set of wheels 30 independently of the wheels 82. It will be understood that, as usual, every third tooth of each pinion 116 is cut away or thinned, to permit the associated spur or segment 120 to pass freely by said pinion when the latter is in normal position. When any pinion 116 is actuated by its segment 120, it is brought to a position which is one-third of a revolution in advance of the position in which it originally stood, and from which it was started by the tooth 115; the tens-carrying train hence moving a third of a revolution at each complete operation, to enable each of the three teeth 117 thereon to engage a gear 122 fixed on the next higher computation wheel 30 to rotate the same through one-tenth of a revolution; said teeth 117 in each instance moving into and out of the path of said gear 122.

Each subtraction-segment or spur (which presently will be described) may be conveniently formed of the same piece of sheet metal as the corresponding addition-segment or spur, and in such case, the double segments will have the shapes illustrated at Figs. 5 and 10. The single segment 120ª may conveniently be made common to both addition and subtraction sets, as shown. It will be understood that the shaft 121 normally occupies such a position that a revolution thereof in either direction will bring a corresponding set of segments into play, while the other set moves idly throughout the revolution. Whichever set of segments first comes into play will turn the pinions 116 to idle or clearance positions, so that they will not be affected by the passage of the other set of segments.

Of the tens-carrying segments or spurs 120, 120ª, Fig. 5ᴬ, only four are splined upon said shaft 121, the remaining four, numbered 123, being mounted upon the sleeve 124, which is loose upon said shaft 121, and is normally held against rotation by a spring detent 125, which engages a notch in a disk 126, which is fixed upon said sleeve 124; shaft 121 being rotatable to a limited extent independently of sleeve 124. These spurs 123 therefore remain stationary while the spurs 120, 120ª operate upon the first four of the tens-carrying trains 116. As soon as the spur 120ª has passed its associated pinion 116, a pin 127, projecting from a collar fixed on the shaft 121, engages a shoulder 128 which is fixed on the sleeve 124, and thereupon said sleeve rotates with the shaft 121, so that the spurs 123 act in succession upon their pinions 116. The last one of the four spurs on this sleeve is marked 123ª, and corresponds to spur 120ª. Tens may be therefore carried along the entire series of computing wheels 30. Said spur shaft 121 is driven by a rack 129, Fig. 17, which is fixed to the general operator slide 32, and drives a gear 130, giving the latter a complete revolution in each of the forward and back strokes of said general operator. This pinion or gear 130 revolves idly during the forward stroke of the operator; but during the return stroke thereof it is caused to give a crank 131 a single complete revolution; a clutch being provided between gear 130 and the crank shaft 132, comprising a ball 133, pressed by a spring 134 into a notch 135 in gear 130; the ball seated in a pocket in the shaft. This crank is connected by a link 136 to a rack 137, which meshes with a pinion 138, the latter fixed to a movement-multiplying gear 139, Figs. 18 and 19, which meshes with a pinion 140 upon or connected to the spur-shaft 121. The gears are so proportioned that the shaft 121 is given more than an entire revolution in one direction, and is then returned to its starting point; both forward and back strokes of said spur-shaft occurring during the return stroke of the general operator 32. The advance stroke of shaft 121 is sufficient to carry the last spur 123ª past the associated pinion 116. At the initial part of the return stroke, the spur sleeve 124 remains stationary, but during such return stroke the pin 127 engages shoulder 143, (Fig. 10), upon sleeve 124, and returns the latter to normal position. At Figs. 12 to 16 is illustrated the coöperation of the corresponding sets of pins and shoulders of the upper tens-carrying trains, which will presently be explained.

In order to perform subtraction, the operation of the spur shaft 121 is reversed, and spurs 144 thereon come into play, while the spurs 120 revolve idly. For the purpose of controlling the operation of said spur-shaft 121, the handle 73, Fig. 20, is connected to a reversing gear. The rock shaft 74, which is operated by said handle 73, has an arm 145, Fig. 20, provided with a shifter pin 146, to engage a peripheral groove in a double ratchet collar 147, which is pinned or fixed to the shaft 121. The driving pinion 140, for said shaft, is fixed to a bevel gear 149, which is loose on the shaft and is connected by a bevel gear 150 to a third bevel gear 151, which is also loose on the shaft. At Fig. 19, the clutch collar 147 is shown shifted to subtraction position.

It will be seen that each of the pinions 149 and 151 has an internal clutch member 152, to engage the corresponding clutch on the adjacent end of the collar 147. The shaft 121, therefore, turns (during the back stroke of the general operator) first in a backward direction, to bring the spurs 144 into play, and then in a forward direction to resume normal position.

The subtraction-spurs 144 are preferably integral with the corresponding addition-spurs 120, as illustrated at Fig. 10; and one of the principal advantages gained by placing some of these spurs on the loose sleeve 124, is the reduction which is made possible in the length of the spurs, thus conducing to compactness of the machine.

It will be understood that after any spur has turned its associated pinion, the other spur that works in the same plane will rotate idly past the pinion during the first stroke of the shaft 121; and that both spurs will rotate idly past said pinion during the return stroke of said shaft to normal position.

At the subtraction operation, the pin 127 and the shoulders 128, 143 are separated and silenced, but a pin 153 (also fixed on a collar on said shaft 121) is moved into position for engagement with a shoulder 154 fixed on the sleeve 124; this shifting of the pin 153 being effected by means of an endwise movement of shaft 121 effected by arm 145, pin 146, and collar 147. A spline 155 (Fig. 5ᴬ) permits endwise shifting of shaft 121 relatively to spur sleeve 121ª thereon.

During the rotation of the shaft 121 at the subtraction operation, the sleeve 121ª rotates to a certain extent to bring the spurs 144 into action while the sleeve 124 remains stationary; and during the final portion of the same movement of shaft 121, the pin 153 engages the shoulder 154 and turns said sleeve 124 until all the subtraction spurs 156 thereon have operated. During the return of the shaft 121 to normal position, the sleeve 121ª first rotates idly, and then the pin 153 engages a shoulder 157 upon the sleeve 124, and returns it to normal position, where it is held by the detent 125.

For the computing wheels 82 there is provided an additional tens-carrying and subtracting mechanism, (Figs. 12 and 15) similar to that already described for the wheels 30; each of said wheels 82 having a starting tooth 160 to engage any of the nine teeth on a pinion 161, to start the same to the position seen at Fig. 13, during the motion of the wheel 82 from "9" to "0". The tens-carrying trains 161, etc., may be loosely mounted upon a fixed shaft 162 above the tens-carrying trains 116, etc., which are loosely mounted upon the separate fixed shaft 118ª. The pinions 161 are similar to pinions 116 and are connected by long hubs 163 to three-toothed gears 164 similar to gears 117 and meshing with gears 165 fixed on wheels 82 and similar to gears 122.

By the movement of the starting-tooth 160 and wheel 82 to the zero position of Fig. 13, the pinion 161 is rotated to bring a tooth thereof into the path of a spur or segment 166 fixed on hollow shaft or sleeve 167, so that by the rotation of said sleeve 167 the train 161, 164 may be operated to carry tens to the next higher computing wheel 82, whether the intervening computing wheel 30 is being operated by its tens-carrying mechanism or not.

The spur mechanism for the upper tens-carrying and borrowing frames 161, 163, 164 is similar to that for the lower trains already described. The sleeve 167 is connected to shaft 169 by a spline 168, so that by rotation of said shaft the spurs may be operated. Broad-toothed detent 169ª engages notched disk 169ᵇ, Fig. 15, to hold shaft 169 in normal rotative position. Upon the shaft 169 is also mounted a loose sleeve 170, carrying addition spurs 171, and having shoulder 172 to be engaged by a pin 174, after the spurs 166 have performed their functions. The sleeve 170 also has a shoulder 175 to be engaged by said pin 174 upon the return stroke of the shaft 169, whereby sleeve 170 is returned to normal position.

The sleeves 167 and 170 also have subtraction spurs 176, which come into play to operate the trains to borrow tens, when the handle 109 is shifted to the right at Figs. 3 and 20; the shaft 108 having an arm 177 provided with a pin 178, which engages a groove in a collar 179 fixed on the shaft 169, whereby the shaft is shifted endwise to disengage the pin 174 from the shoulders 172, 175, and to shift a pin 180 to position to engage shoulders 181, 182 on the spur sleeve 170. Spurs 166$^a$ and 171$^a$ are for both addition and subtraction.

The collar 179 also forms part of a clutch train which comprises pinions 183, 184, 185, said pinions 183 and 185 having internal ratchets or clutch members which are engageable by ratchets 186, 187 formed on the ends of the collar 179. When the collar and shaft are shifted to the Fig. 19 position, addition will be performed by the tens-carrying trains. If shifted to the opposite position, subtraction will be performed. Said bevel pinion 183 is fixed to a pinion 188, which meshes with the driving gear 139, and is similar to the pinion 140 also in mesh with said gear.

From the foregoing it will be seen that either handle 73 or 109 may be swung to either the right or the left independently of the other handle, so that at a single setting of the pins 20 and at a single operation of the general operator 32, either addition or subtraction may be performed upon either set of dial wheels, while the other set is also caused to either add or subtract.

Upon each of the shafts 121, 169 is provided a collar 189, to be engaged by a compression spring 190$^a$ to hold the same in or constantly urge it toward addition position. Provision is made for lost motion between the handle 73 and the shifter arm 145, to permit the handle 73 to occupy an intermediate position, as at Fig. 20, while the shaft 121 is in addition position, for which purpose a pin 190 fixed on the rock shaft 174 is arranged to work in a recess 191 in the loose hub 192 of said arm 145; the ends of the recess forming abutments to be engaged by the pin to swing the arm 145. A similar provision is made in respect to the arm 177; a pin 193 working in a recess in the loose hub 194 of the arm 177. It will be borne in mind that when either shift handle 73 or 109 is in its middle position, the computation racks 28 and 41, etc., are all held out of mesh with the computation pinions, so that no computation is performed at the operation of the general operator 32. This permits either set of computation wheels to be silenced while either addition or subtraction is performed upon the other set.

When it is desired to return all of the dial wheels 82 to zero, a key 200 (have a returning spring 201) is pressed down, to depress an arm 202 on a rock shaft 203, the latter also having a rearwardly extending arm 204, carrying a pin 205, which lifts a bar 206. This bar is similar to the zero bar in the Underwood-Hanson typewriting and adding machine; the same carrying at its rear end a pin 207, which, when the bar 206 rises, is arrested by an abutment 208, so that further rise of the bar causes the pin to protrude below the same. When the key 200 and the bar 206 return to normal positions, the pin 207 will project below the bar into the path of the cross-bar 36 of the general operator, so that the next forward movement of the general operator will advance the bar 206 and cause a rack 209 thereon to rotate a pinion 210, which is loose on the arbor 83, but is clutched thereto so as to rotate the same during the forward stroke of the rack 209; the clutch comprising a ball 211 seated in a pocket in the splined hub, and having a spring to press it into a recess formed in the pinion 210; this being the style of clutch that is shown in other instances in the accompanying drawings. All of the dial wheels 82 are loose on said arbor 83, but each has a recess 214, Fig. 9, into which a ball 215 is pressed by a spring 216, the ball and spring seated in a pocket 217 in the arbor 83; said recess 214 being adapted to enable the arbor 83 to rotate each of the dial wheels 82 in the proper direction for addition. All of the wheels 82 may thus be turned simultaneously, so that each shows "9" through the sight holes 86, with the exception of the units wheel 82, which shows "0;" the units pocket 217 in the arbor 83 being one-tenth of a revolution in advance of the remaining pockets 217, Fig. 20. The movement of the units wheel 82 to zero enables its starting-tooth 160 to start the associated tens-carrying train; and hence upon the return movement of the general operator, tens will be carried along the whole set of wheels 82, so that they will all be advanced one point and show "0" through the sight holes. Said arbor 83 is made shiftable endwise independently of the computing wheels thereon, to enable cam surfaces 218, formed laterally in the recesses 214, to cam the balls 215 down into the recesses 217, so that they will not interfere with the subtraction operation; and the handle 109 is provided with an arm 219, Fig. 20, which has a pin 220 to engage a grooved collar 221 on arbor 83, to shift the same to the left and silence the balls and clutches 215 when subtraction is to be performed; the arbor 83 being constantly pressed endwise toward addition position (or toward the right) by a spring 222, engaging a collar 223 fixed on said arbor. The movement of said handle 109 to either extreme position will position the arbor 83 correspondingly; so that when said handle 109 is set to add, the arbor will be brought to position, to render the zero clutches 215 effective. Moreover, said arbor may be shifted by said spring 222 to addition position when the handle 109 is in neutral position. The detent spring 111 should therefore be more powerful than spring 222. Upon the end of the arbor 83 is fixed a disk 224, having the usual notch to be engaged by the usual spring detent 225. It will be seen that the clutches 215 are spaced at wide intervals along the arbor 83; the wheels 30 which are interjacent between the wheels 82 being unprovided with clutches, and not being returned to zero by said arbor 83. The wheels 82 may be returned to zero independently of the wheels 30, so that, if desired, there may be accumulated upon the wheels 30 the aggregate or net result of the computations performed upon the wheels 82 from time to time.

A separate arbor 230 is provided for returning the interjacent dial wheels 30 to zero. Loose upon this arbor 230 are toothed wheels 231, meshing with similar toothed wheels 122 fixed on said dial wheels 30 as aforesaid. These wheels 231 rotate idly during the performance of computation upon said wheels 30. They are used, however, to rotate the computing wheels 30 to zero, the arbor 230 for this purpose corresponding generally in construction and operation to the arbor 83. These toothed wheels or gears 231 have hubs 233 of sufficient length to pass the interjacent dial wheels 82. Each wheel 231 has a recess 234 to receive a clutching ball 235, pressed by spring 236 seated in pocket 237, these parts corresponding to those numbered 214 to 217. To turn the wheels 30 to zero, a key 238 is depressed, and the stem thereof, (provided with a returning spring 240), depresses the forward end of a lever 241, said lever comprising a rear arm 242 corresponding to arm 204, and having a projection 243 to lift a rack bar 244, the latter having a settable pin 245 corresponding in construction and operation with pin 207.

Upon the forward end of the bar 244 is a rack 246 to mesh with a pinion 247, which is connected by a ball clutch 211 to the arbor 230 in the same manner as the zero pinion 210 is connected to the arbor 83, so that said arbor 230 may be rotated a full revolution counterclockwise at Fig. 17 during the advance stroke of the general operator, and may remain stationary during the return stroke of the general operator, said pinion rotating idly during said return stroke. Said arbor 230 may have a notched disk 249, engaged as usual by a spring detent 250 to hold the arbor in normal rotative position. As the arbor 230 rotates, it will pick up the various gears 231 thereon, and thereby rotate all of the dial wheels 30 to show "9" through the sight holes, except the units wheel 30, which is rotated to "0". During the return stroke of the general operator, the remaining wheels 30 are advanced by the tenscarrying trains to "0" in the manner just explained with relation to the wheels 82; the wheels 30 being, of course, loose on said arbor 83.

The recesses 234 in the gears 231 have laterally inclined walls 251, to enable the movement of the arbor 230 toward the left at Fig. 9 to cam the clutches 235 downwardly to inoperative positions, to permit subtraction to be performed. The arbor 230 is constantly pressed toward the left or toward addition position by a spring 252 engaging a collar 253 fixed on said arbor. Hence the arbor is ready for its zeroizing operation, when the handle 73 is in either addition or neutral position; spring 252 being weaker than detent spring 78.

The handle 73 swings an arm 254, Fig. 20, (fixed to arm 74ª) said arm 254 having a pin 255 to engage a peripherally grooved collar 256, fixed on said arbor 230, to shift the same endwise. When the handle is swung to the addition position, so as to permit the wheels 30 to be set to zero, the arbor 230 is carried to the left at Fig. 9, to permit the clutches to act upon the wheels 231, but when the handle 73 is swung to the subtraction position, said arbor 230 is shifted to the right, and the clutches are silenced. The handle 73 may be in its midway position at Fig. 20 when the arbor 230 is in its addition position, as the groove in the collar 256 is sufficiently wide to permit it.

It will be seen that the wheels 30 may all be returned to zero independently of the wheels 82, so that, if desired, there may be accumulated on said wheels 82 the aggregate or net result of the computations performed upon the wheels 30 from time to time. It will be understood, however, that other devices may be employed for returning either or both computing heads to zero, and that either or both may be unprovided with zeroizing mechanism.

When either set of computing wheels is to be returned to zero, it is desired that its associated setting-handle 73 or 109 should be in the neutral position, as at Fig. 3, so that none of the computation-rack bars 21 or 88 shall be in engagement with its associated pinion; and hence, when either computing head is being returned to zero, its pinions will not be able to advance the bars 21, 88. Therefore neither computing head can be affected by the return of the other computing head to zero. Accordingly, the shafts 121 and 169, and the arbors 83 and 230, are all caused to assume addition positions while said handles stand at neutral, so that the necessary movements of the dial wheels, in addition direction, may be performed at the zeroizing operation, even though none of the bars 21, 88, are stirred from their normal positions during such zeroizing operation. The spring 111 holds the handle 109 in midway position while said springs 222 hold their associated shafts in addition position, there being sufficient lost motion for this purpose at the junction of the lever 109 with the arbor 83; and the same is true of the spring 78.

When the zero key 200 is depressed, its lever 202 cams forwardly a lever 260, pivoted upon a shaft 261, and carrying at its upper end a V-hook or notch 262, which swings rearwardly and engages a pin 263 fixed upon the rock shaft 108, to rock handle 109 to midway position, as at Fig. 20. The zero key 238 in a similar manner cams an arm 264, which at its upper end has a centering notch 265 to engage a pin 266 on the rock shaft 74, to bring the handle 73 to neutral position. Hence whenever either zero key is depressed, the parts associated therewith are brought to positions for enabling the associated computation wheels to be advanced to zero positions, through the instrumentality of the zeroizing rack and the carry-over mechanism; while the computation-pin racks remain silenced, owing to the fact that the sleeves 53 and 102 remain in neutral positions, during the operation of the general operator, and therefore the pin-carrying racks remain out of engagement with their pinions.

The hubs 267 and 268 of the pinions 210 and 247 remain stationary with their pinions during the endwise shifting of their respective arbors 83 and 230. Each of these hubs may have a peripheral groove as shown diagrammatically at 269, Fig. 4ᵃ, and these grooves may be engaged by fixed fingers, 270, Figs. 4 and 4ᴬ, to hold them from displacement in axial direction. Any suitable device may be provided for holding the racks 209 and 246 against lateral displacement. Each of the arbors 83 and 230 may have a spline 271 fitting in a longitudinal slot 272 in the pinion hub, to cause the hub to rotate always with the arbor.

Variations may be resorted to within the scope of the invention, and portions of the improvements may be used without others.

Having thus described my invention, I claim:

1. The combination with pin-carrying bars and computation wheels controlled thereby, said bars normally disconnected from said wheels, of a general operator to engage the pins and drive the bars, said general operator constructed to have lost motion at the beginning of its advance before engaging any of the computation pins, and means connected to said general operator and effective during such lost motion for connecting said bars to said computation wheels.

2. The combination with pin-carrying bars and computation wheels controlled thereby, said bars normally disconnected from said wheels, of a general operator to engage the pins and drive the bars, said general operator constructed to have lost motion at the beginning of its advance before engaging any of the computation pins, means connected to said general operator and effective during such lost motion for connecting said bars to said computation wheels, each bar comprising opposite racks, and shiftable means for determining which of the opposite sets of racks shall connect with the computation wheels during such lost motion of the general operator.

3. The combination with computation pinions, of computation-pin bars having opposite racks normally disconnected from said pinions, a general operator for advancing said bars, a transverse rack-controlling bar having at intervals cross-heads carrying blocks or shoes to engage and control said opposite racks, and means connected to the general operator for shifting said rack-controlling bar.

4. The combination with computation pinions, of computation-pin bars having opposite racks normally disconnected from said pinions, a general operator for advancing said bars, a transverse rack-controlling bar having at intervals cross-heads carrying blocks or shoes to engage and control said opposite racks, means connected to the general operator for shifting said rack-controlling bar, said shifting means including a frame having arms to which said bar is swiveled, and an idle link connected to said bar to guide the same.

5. The combination with pin-carrying bars and computation wheels controlled thereby, said bars normally disconnected from said wheels, of a general operator to engage the pins and drive the bars, said general operator constructed to have lost motion at the beginning of its advance before engaging any of the computation pins, means connected to said general operator and effective during such lost motion for connecting said bars to said computation wheels, each bar comprising opposite racks, shiftable means for determining which of the opposite sets of racks shall connect with the computation wheels during such lost motion of the general operator, and means operating automatically upon the conclusion of the forward stroke of the general operator for disconnecting said racks from said wheels, to permit the racks to be returned to normal positions independently of the wheels.

6. The combination with pin-carrying bars and computation wheels controlled thereby, said bars normally disconnected from said wheels, of a general operator to engage the pins and drive the bars, said general operator constructed to have lost motion at the beginning of its advance before engaging any of the computation pins, means connected to said general operator and effective during such lost motion for connecting said bars to said computation wheels, each bar comprising opposite racks, shiftable means for determining which of the opposite sets of racks shall connect with the computation wheels during such lost motion of the general operator, and means for detaining said shiftable means in a normal neutral position, to silence all the racks controlled thereby.

7. The combination of two sets of interjacent computation wheels, racks for said wheels, said racks arranged in pairs for adjacent wheels in the different sets, and the racks of each pair being pivoted together, a single set of computation pins for each pair of racks, and a general operator for advancing and returning the racks.

8. The combination of two sets of interjacent computation wheels, racks for said wheels, said racks arranged in pairs for adjacent wheels in the different sets, and the racks of each pair being pivoted together, a single set of computation pins for each pair of racks, a general operator for advancing and returning the racks; and means for rendering the racks in either set effective while the racks in the other set are silent or ineffective.

9. The combination of two sets of interjacent computation wheels, racks for said wheels, said racks arranged in pairs for adjacent wheels in the different sets, and the racks of each pair being pivoted together, a single set of computation pins for each pair of racks, a general operator for advancing and returning the racks; all of said racks normally out of engagement with said computation wheels, and means for shifting either set of racks into mesh with its wheels independently of the other set.

10. The combination of two sets of interjacent computation wheels, bars for operating said wheels, each bar having opposite racks, said bars arranged in pairs to associate together adjacent wheels in the different sets, and the bars in each pair being pivoted together, a single set of computation pins for each pair of bars, a general operator for advancing and returning the bars, and means for shifting the bars in one set into or out of connection with their wheels independently of the bars in the other set.

11. The combination of two sets of interjacent computation wheels, bars for operating said wheels, each bar having opposite racks, said bars arranged in pairs to associate to adjacent wheels in the different sets, and the bars in each pair being pivoted together, a single set of computation pins for each pair of bars, a general operator for advancing and returning the bars, and means for shifting the bars in either set into or out of connection with its wheels independently of the bars in the other set.

12. The combination of two sets of interjacent computation wheels, bars for operating said wheels, each bar having opposite racks, said bars arranged in pairs to associate together adjacent wheels in the different sets, and the bars in each pair being pivoted together, a single set of computation pins for each pair of bars, a general operator for advancing and returning the bars, means for shifting the bars in either set into or out of connection with their wheels independently of the bars in the other set, and means for shifting the bars in either set to bring either set of racks thereon into mesh with the associated wheels, while either one of the sets of racks on the other set of bars is in mesh with its associated wheels.

13. The combination of two sets of interjacent computation wheels, bars for operating said wheels, each bar having opposite racks, said bars arranged in pairs to associate together adjacent wheels in the different sets, and the bars in each pair being pivoted together, a single set of computation pins for each pair of bars, a general operator for advancing and returning the bars, means for shifting the bars in either set into or out of connection with their wheels independently of the bars in the other set, and means for shifting the bars in either set to bring either set of racks thereon into mesh with the associated wheels, while either one of the sets of racks on the other set of bars is either in mesh with its associated wheels or silenced.

14. The combination with interjacent sets of computation wheels, of a set of pairs of racks, each pair having a single set of computation pins or devices, and means for operating the racks in each pair to turn interjacent wheels concomitantly in either the same or opposite directions.

15. The combination with interjacent sets of computation wheels, of a set of pairs of racks, each pair having a single set of computation pins or devices, and means for operating the racks in each pair to turn interjacent wheels concomitantly in either the same or opposite directions, or to turn only one of the interjacent wheels while the other remains stationary.

16. The combination with a plurality of computing heads comprising computation wheels or members, the wheels in one head being interjacent with those in the other head, of a single system of computation pins, and means to coöperate with said pins to effect both addition and subtraction of the same number on the different computing heads, or to effect simultaneous addition on said heads, or to effect simultaneous subtraction on said heads, or to perform either addition or subtraction on either head while the other remains silent.

17. The combination with two sets of computation pinions, those in one set interjacent with those of the other set, of two sets of computation pin-bars each having opposite racks normally disconnected from said pinions, one set of bars for each set of computation pinions, the bars being divided into pairs, the bars in each pair constructed for operation of interjacent pinions, all of said racks normally disconnected from said pinions, a general operator for advancing said bars, two independent rack-shifting bars, each having at intervals cross-heads carrying blocks or shoes to engage and control the opposite racks on the adjacent pin bar, and regulatable means connected to the general operator for shifting either rack-shifting bar up and down independently of the other rack-shifting bar.

18. The combination of two sets of interjacent computing wheels, two sets of pin-carrying computation bars, each having opposite racks, said racks associated with said wheels, the bars of one set interjacent with those of the other set, a general operator for driving said bars including a rock shaft, a sleeve splined thereon, means to enable said sleeve to shift the bars of one of said sets, a second sleeve loose upon the first sleeve and also splined to said rock shaft, and means to enable said second sleeve to shift the bars of the other of said sets.

19. The combination of two sets of interjacent computing wheels, two sets of pin-carrying computation bars, each having opposite racks, said racks associated with said wheels, the bars of one set interjacent with those of the other set, a general operator for driving said bars including a rock shaft, a sleeve splined thereon, means to enable said sleeve to shift the bars of one of said sets, a second sleeve loose upon the first sleeve and also splined to said rock shaft, means to enable said second sleeve to shift the bars of the other of said sets, and means to shift either sleeve along the shaft in either direction and thereby determine whether addition or subtraction will be performed by the racks under control thereof.

20. The combination with a set of dial wheels or members, of tens-carrying trains, power-driven spurs for effecting the operation of said trains *seriatim;* said spurs divided into two groups, and means for operating one group while the second group is stationary, and for then operating the second group.

21. The combination with dial wheels or members, and reversible means for rotating them either forwardly or backwardly, of carry-over trains, oppositely arranged spurs for driving the carry-over trains in either one direction or the other, shiftable means for rotating said spurs either forwardly or backwardly, the spurs divided into groups, each group having spirally arranged spurs for addition and oppositely arranged spurs for subtraction, and means for rotating the first group while the second group is stationary, and for then rotating the second group.

22. The combination with dial wheels or members, and reversible means for rotating them either forwardly or backwardly, of carry-over trains, oppositely arranged spurs for driving the carry-over trains in either one direction or the other, shiftable means for rotating said spurs either forwardly or backwardly, the spurs divided into groups, each group having spirally arranged spurs for addition and oppositely arranged spurs for subtraction, means for rotating the first group while the second group is stationary, and for then rotating the second group, and means for returning all the spurs to normal positions.

23. The combination with dial wheels or members, and reversible means for rotating them either forwardly or backwardly, of carry-over trains, oppositely arranged spurs for driving the carry-over trains in either one direction or the other, shiftable means for rotating said spurs either forwardly or backwardly, the spurs divided into groups, each group having spirally arranged spurs for addition and oppositely arranged spurs for subtraction, and means for rotating the first group while the second group is stationary, and for then rotating the second group, said rotating means including a shaft on which said groups of spurs are mounted, the first group of spurs being connected to said shaft to rotate therewith, and a lost-motion connection between said shaft and the second group of spurs.

24. The combination with dial wheels or members, and reversible means for rotating them either forwardly or backwardly, of carry-over trains, oppositely arranged spurs for driving the carry-over trains in either one direction or the other, shiftable means for rotating said spurs either forwardly or backwardly, the spurs divided into groups, each group having spirally arranged spurs for addition and oppositely arranged spurs for subtraction, and means for rotating the first group while the second group is stationary, and for then rotating the second group, said rotating means including a shaft on which said groups of spurs are mounted, the first group of spurs being connected to said shaft to rotate therewith, a lost-motion connection between said shaft and the second group of spurs, a reciprocating general operator having a rack, a gear meshing with said rack to be given a complete revolution at each of the forward and backward strokes of said general operator, said gear connected to revolve idly during the forward stroke of the operator, a crank, a clutch between said gear and said crank, a rack, a link connecting said crank to said rack, a pinion meshing with said rack, a movement-multiplying gear, and a connection from the latter to said spur shaft.

25. The combination with dial wheels or members, and reversible means for rotating them either forwardly or backwardly, of carry-over trains, oppositely arranged spurs for driving the carry-over trains in either one direction or the other, shiftable means for rotating said spurs either forwardly or backwardly, the spurs divided into groups, each group having spirally arranged spurs for addition and oppositely arranged spurs for subtraction, means for rotating the first group while the second group is stationary, and for then rotating the second group, said rotating means including a shaft on which said groups of spurs are mounted, the first group of spurs being connected to said shaft to rotate therewith, a lost-motion connection between said shaft and the second group of spurs, a reciprocating general operator having a rack, a gear meshing with said rack to be given a complete revolution at each of the forward and backward strokes of said general operator, said gear connected to revolve idly during the forward stroke of the operator, a crank, a clutch between said gear and said crank, a rack, a link connecting said crank to said rack, a pinion meshing with said rack, a movement-multiplying gear, and a connection from the latter to said spur-shaft, the trains of gears being so proportioned that said spur-shaft is given more than an entire revolution in one direction, and is then returned to its starting point, both forward and backward strokes of said spur-shaft being timed to occur during the return stroke of said general operator; the second set of spurs remaining stationary at the initial part of the return stroke, but connected to said shaft to be returned to normal position thereby at the conclusion of said stroke, and shiftable means to reverse the operation of said spur-shaft at will, said shiftable means connected to said reversible wheel-rotating means.

26. The combination with two sets of computation wheels, a set of computation bars individual to each set of wheels to control the same, said bars normally disconnected from said wheels, and settable pins for said bars, of a general operator to engage the pins and drive the bars, said general operator constructed to have lost motion at the beginning of its advance before engaging any of the computation pins, and means connected to said general operator and effective during such lost motion for connecting either set of computation bars to its set of computation wheels independently of the other set of bars.

27. The combination with two sets of interjacent computation bars, two sets of interjacent computation wheels controlled thereby, said bars normally disconnected from said wheels, and a set of settable pins for said bars, of a general operator to engage the pins and drive the bars, said general operator constructed to have lost motion at the beginning of its advance before engaging any of the computation pins, means connected to said general operator and effective during such lost motion for connecting each set of said bars to its associated computation wheels, each bar comprising opposite racks, and shiftable means for determining which of the opposite sets of racks in each set shall connect with their computation wheels during such lost motion of the general operator.

28. The combination with two sets of interjacent computation pinions, of computation-pin bars having opposite racks normally disconnected from said pinions, a general operator for advancing said bars, transverse rack-controlling bars each having at intervals cross-heads carrying blocks or shoes to engage and control its associated opposite racks, and means connected to the general operator for shifting said rack-controlling bars independently of each other.

29. The combination with two sets of interjacent computation pinions, of two sets of computation bars having opposite racks normally disconnected from said pinions, settable pins for said bars, a general operator for advancing said bars, two independent transverse rack-controlling bars, each having at intervals cross-heads carrying blocks or shoes to engage and control said opposite racks, means connected to the general operator for shifting said rack-controlling bars independently of each other, said shifting means including frames having arms to which said bars are swiveled, and idle links connected to said bars to guide the same.

30. The combination with two sets of computation bars and two sets of computation wheels driven thereby, said bars each comprising opposite racks normally disconnected from said wheels, of settable pins for said bars, a general operator to engage the pins and drive the bars, means actuated by said general operator for connecting the racks of one set of bars to the corresponding set of computation wheels independently of those of the other set of bars, shiftable means for determining which of the opposite sets of racks on each set of bars shall be connected by said general operator with the computation wheels, and means operating automatically upon the conclusion of the forward stroke of the general operator for disconnecting said racks from said wheels, to permit the racks to be returned to normal positions independently of the wheels.

31. The combination, with computation wheels, and controlling bars, each bar comprising opposed, wheel-driving racks normally disconnected from said wheels; of a general operator arranged to engage and drive said bars, but having a limited lost motion before such engagement takes place; means for connecting either set of racks with said wheels; and shiftable means connected to said general operator and operative, during such lost motion, upon said connecting means, to determine which set of racks shall be connected thereby, said shiftable means being movable into ineffective position with relation to said connecting means, to silence the latter.

32. The combination of two sets of interjacent computing wheels, racks for said wheels, said racks arranged in pairs for adjacent wheels in the different sets, and the racks of each pair being pivoted together, a single set of computation pins for each pair of racks, a general operator for advancing and returning the racks, and two systems of carry-over devices, one for each set of computing wheels.

33. The combination of two sets of interjacent computing wheels, racks for said wheels, said racks arranged in pairs for adjacent wheels in the different sets, and the racks of each pair being pivoted together, a single set of computation pins for each pair of racks, a general operator for advancing and returning the racks; means for rendering the racks in either set effective while the racks in the other set are silent or ineffective, and two systems of carry-over devices, one for each set of computing wheels.

34. The combination of two sets of interjacent computation wheels, racks for said wheels, said racks arranged in pairs for adjacent wheels in the different sets, and the racks of each pair being pivoted together, a single set of computation pins for each pair of racks, a general operator for advancing and returning the racks; all of said racks normally out of engagement with said computation wheels, means controlled by said general operator for shifting either set of racks into mesh with its wheels independently of the other set, setting means for said shifting means, a finger-piece connected to said setting means, and means for automatically disengaging the racks from the wheels.

35. The combination with two sets of computation pinions, those in one set interjacent with those of the other set, of two sets of computation pin-bars each having opposite racks normally disconnected from said pinions, one set of bars for each set of computation pinions, the bars being divided into pairs, the bars in each pair constructed for operation of interjacent pinions, all of said racks normally disconnected from said pinions, a general operator for advancing said bars, two independent rack-shifting bars, each having at intervals cross-heads carrying blocks or shoes to engage and control the opposite racks on the adjacent pin-bar, regulatable means connected to the general operator for shifting either rack-shifting bar up and down independently of the other rack-shifting bar, and means independent of said pin-bars arranged to coöperate with said general operator for returning the computation wheels in either set to zero independently of the other set.

36. The combination of two sets of computing wheels, two sets of computation bars, each having racks, said racks associated with said wheels, settable pins for determining the extent of movement of said bars, a general operator for driving said bars including a rock shaft, a sleeve splined thereon, means to enable said sleeve to shift the bars of one of said sets, a second sleeve loose upon the first sleeve and also splined to said rock shaft, and means to enable said second sleeve to shift the bars of the other of said sets.

37. The combination of two sets of interjacent computing wheels, two sets of pin-carrying computation bars, each having opposite racks, said racks associated with said wheels, the bars of one set interjacent with those of the other set, a general operator for driving said bars including a rock shaft, a sleeve splined thereon, means to enable said sleeve to shift the bars on one of said sets, a second sleeve loose upon the first sleeve and also splined to said rock shaft, means to enable said second sleeve to shift the bars of the other of said sets, means to shift either sleeve along the shaft in either direction and thereby determine whether addition or subtraction will be performed by the racks under control thereof, and means to hold the sleeves in midway silenced positions and simultaneously return the wheels to zero.

38. The combination with two sets of computation wheels or members, the wheels of one set interjacent with those of the other set, of two independently adjustable handles or finger-pieces, means capable of rotating the wheels, means for determining the extent of rotation of the wheels, means coöperating with said handles to effect either addition or subtraction upon one set of wheels while either addition or subtraction is being performed upon the other set of wheels, and means to return either set of wheels to zero, while its associated handle is in silencing or neutral position, and independently of the other set.

39. The combination with two sets of computation wheels or members, the wheels of one set interjacent with those of the other set, of two independently adjustable handles or finger-pieces, means capable of rotating the wheels, means for determining the extent of rotation of the wheels, means coöperating with said handles to cause either set of wheels to perform addition or subtraction while the other set of wheels is either silenced or performing either addition or subtraction, and means to return either set of wheels to zero, while its associated handle is in silencing or neutral position, and independently of the other set.

40. The combination with two sets of interjacent dial wheels or members, of two sets of interjacent tens-carrying trains, and two sets of interjacent power-driven spurs for effecting the operation of said trains *seriatim;* the spurs in each set divided into two groups, a general operator, and means connected to said general operator for operating one group in each set, while the second group is stationary, and for then operating the second group.

41. The combination with a general operator, two sets of interjacent dial wheels or members, and reversible means for rotating the wheels in either set either forwardly or backwardly, while those in the other set are rotated either forwardly or backwardly, of two sets of carry-over trains, two systems of oppositely arranged spurs for driving the carry-over trains in either one direction or the other, two sets of shiftable means for rotating said spurs either forwardly or backwardly, the spurs in each system divided into groups, each group having spirally arranged spurs for addition and oppositely arranged spurs for subtraction, and means connected to said general operator for rotating the first group in each system while the second group is stationary, and for then rotating the second group.

42. The combination with a general operator, two sets of interjacent dial wheels or members and reversible means for rotating the wheels in either set either forwardly or backwardly, while those in the other set are rotated either forwardly or backwardly, of two sets of carry-over trains, two systems of oppositely arranged spurs for driving the carry-over trains in either one direction or the other, two sets of shiftable means for rotating said spurs either forwardly or backwardly, the spurs in each system divided into groups, each group having spirally arranged spurs for addition and oppositely arranged spurs for subtraction, means connected to said general operator for rotating the first group in each system while the second group is stationary, and for then rotating the second group, and means for returning all the spurs to normal position.

43. The combination with a general operator, of duplicate computing mechanisms connected thereto, each mechanism comprising the following elements, viz., dial wheels or members, reversible means for rotating them either forwardly or backwardly, carry-over trains, oppositely arranged spurs for driving the carry-over trains in either one direction or the other, shiftable means for rotating said spurs either forwardly or backwardly, the spurs divided into groups, each group having spirally arranged spurs for addition and oppositely arranged spurs for subtraction, and means for rotating the first group while the second group is stationary, and for then rotating the second group, said rotating means including a shaft on which said groups of spurs are mounted, the first group of spurs being connected to said shaft to rotate therewith, and a lost-motion connection between said shaft and the second group of spurs.

44. The combination with a general operator, of duplicate computing mechanisms connected thereto, each mechanism comprising the following elements, viz., dial wheels or members, and reversible means for rotating them either forwardly or backwardly, carry-over trains, oppositely arranged spurs for driving the carry-over trains in either one direction or the other, shiftable means for rotating said spurs either forwardly or backwardly, the spurs divided into groups, each group having spirally arranged spurs for addition and oppositely arranged spurs for subtraction, means for rotating the first group while the second group is stationary and for then rotating the second group, said rotating means including a shaft on which said groups of spurs are mounted, the first group of spurs being connected to said shaft to rotate therewith, and a lost motion connection between said shaft and the second group of spurs; said general operator having a rack, a gear meshing with said rack to be given a complete revolution at each of the forward and backward strokes of said general operator, said gear connected to revolve idly during the forward stroke of the operator, a crank, a clutch between said gear and said crank, a rack, a link connecting said crank to said rack, a pinion meshing with said rack, a movement-multiplying gear, and connections from the latter to said spur shafts.

45. The combination with a general operator, of duplicate computing mechanisms connected thereto, each mechanism comprising the following elements, viz., dial wheels or members, and reversible means for rotating them either forwardly or backwardly, carry-over trains, oppositely arranged spurs for driving the carry-over trains in either one direction or the other, shiftable means for rotating said spurs either forwardly or backwardly, the spurs divided into groups, each group having spirally arranged spurs for addition, and oppositely arranged spurs for subtraction, means for rotating the first group while the second group is stationary and for then rotating the second group, said rotating means including a shaft on which said groups of spurs are mounted, the first group of spurs being connected to said shaft to rotate therewith, a lost motion connection between said shaft and the second group of spurs; said general operator having a rack, a gear meshing with said rack to be given a complete revolution at each of the forward and backward strokes of said general operator, said gear connected to revolve idly during the forward stroke of the operator, a crank, a clutch between said gear and said crank, a rack, a link connecting said crank to said rack, a pinion meshing with said rack, a movement-multiplying gear, and connections from the latter to said spur shafts, the trains of gears being so proportioned that each of said spur-shafts is given more than an entire revolution in one direction and then returned to its starting point, both forward and backward strokes of said spur-shafts being timed to occur during the return stroke of said general operator; the second set of spurs in each system remaining stationary at the initial part of the return stroke, but connected to said shaft to be returned to normal position thereby at the conclusion of said stroke, and shiftable means to reverse the operation of said spur-shafts at will.

46. The combination of a set of computing wheels; driving racks therefor; a general operator for driving said racks; means to return the wheels to zero; and means for maintaining said racks in ineffective position with relation to said wheels while the latter are being returned to zero.

47. The combination of a set of computation wheels, an arbor upon which they are loosely mounted, a general operator, means including key-set pins to enable said general operator to drive said wheels either forwardly or backwardly for either addition or subtraction, means to coöperate with said general operator to rotate said arbor to return the wheels to zero, said arbor having individual clutches to engage said wheels for this purpose, means to determine whether addition or subtraction shall be performed, a finger-piece connected to said determining means, means for holding the finger-piece in a neutral position, means to enable said finger-piece to shift said arbor endwise when subtraction is to be performed, means called into action at such endwise shift of said arbor for releasing the clutches thereon, and a spring tending to move said arbor endwise in the opposite direction, and to hold the clutches in effective positions while said finger-piece is in neutral position.

48. The combination of two sets of interjacent computation wheels, arbors upon which they are loosely mounted, a general operator, means including key-set pins to enable said general operator to drive the wheels in either set either forwardly or backwardly for either addition or subtraction, a third arbor, gears loosely mounted on said third arbor, gears on the wheels in one of said sets to mesh with said gears, means to coöperate with said general operator to rotate the first and third arbors, to return all the computation wheels to zero, said first and third arbors having individual clutches to engage their wheels and gears for this purpose, means to determine whether addition or subtraction shall be performed upon the sets of wheels, finger-pieces connected to said determining means, means for holding each of the finger-pieces in a neutral position, means to enable the finger-pieces to shift their arbors endwise when subtraction is to be performed, means being called into action at such endwise shift of the arbors for releasing the clutches thereon, and springs tending to move the arbors endwise in the opposite direction, and to hold the clutches in effective positions while said finger-pieces are in neutral positions.

49. The combination with a plurality of computing heads, each having a plurality of computing wheels, of a series of racks, one for each of said wheels, the corresponding racks of the different heads being joined to move in unison and yet adjustable relatively to each other so as to vary their effect.

50. The combination with a plurality of computing heads, each having a plurality of computing wheels, of a composite rack having a plurality of rack members registering simultaneously with corresponding computing wheels of each head, said rack members being joined positively, so as to move in unison and variable individually to determine their effectiveness.

51. The combination with a plurality of computing heads, each having a plurality of computing wheels, of a series of drivers, one for each of said wheels, the corresponding drivers of the different heads being united to drive in unison and yet adjustable relatively to each other so as to vary their effect.

52. The combination with a plurality of computing heads, each having a plurality of computing wheels, of a composite driver having a plurality of driving elements registering simultaneously with corresponding computing wheels of each head, said driving elements being joined positively so as to drive in unison and adjustable individually to determine their effectiveness.

53. The combination with a plurality of computing heads, each having a plurality of computing wheels, of a composite rack having a plurality of rack members registering simultaneously with corresponding computing wheels of each head, said rack members being pivotally joined so as to move in unison and so as to be swung individually to determine their effectiveness.

54. The combination with a plurality of computing heads, each having a plurality of computing wheels, of a composite rack having a plurality of rack members registering individually with corresponding computing wheels of each head, said rack members being joined positively so as to move in unison and variable individually to determine their effectiveness, each of said rack members also having oppositely-facing rack portions so as to drive said computing wheels in opposite directions.

55. The combination with a plurality of computing heads, each having a plurality of computing wheels, of a series of composite actuating members for said computing wheels, each composite actuating member having an actuating element individual to each computing head, so that all of the corresponding wheels in the several heads may be actuated simultaneously by an actuating member, each of said actuating elements being duplex so as to drive said computing wheels selectively in opposite directions.

56. The combination with a series of computing wheels, of a tens-carrying mechanism acting successively in sections, each section having an individual element acting *seriatim* on the associated computing wheels.

57. The combination with a series of computing wheels, of a tens-carrying mechanism for said computing wheels having a plurality of sections, solely one section being active at a time, the remainder of the tens-carrying mechanism being dormant and coming into play in turn, each section having a series of elements operative *seriatim* with respect to associated computing wheels.

58. The combination with a plurality of sets of computing wheels, of a single set of numeral keys common to said sets, a system of computation-determining elements controlled by said keys, a plurality of sets of actuating elements, one set individual to each set of computing wheels, and controlled in the extent of their movement by said computation-determining elements, means for simultaneously operating all of the actuating elements, to run up at the same time all of the digits of a number to be computed, and means for determining the character of action of said actuating elements on any set of computing wheels.

59. The combination with a plurality of sets of computing wheels, of a single set of computation-determining elements, a plurality of sets of actuating elements, one set individual to each set of computing wheels, and controlled in the extent of their movement by said computation-determining elements, means for simultaneously operating all of the actuating elements, to run up at the same time all of the digits of a number to be computed, and means for causing any set of actuating elements to move idly while said computing wheels remain stationary.

60. The combination with a plurality of sets of computing wheels, of a single set of computation-determining elements, a plurality of sets of actuating elements, one set individual to each set of computing wheels, and controlled in the extent of their movement by said computation-determining elements, means for simultaneously operating all of said actuating elements, to run up at the same time all of the digits of a number to be computed, and means for causing any set of said actuating elements during such operation to rotate the associated computing wheels either forwardly or backwardly independently of the action of the other sets of actuating elements.

61. The combination with a plurality of sets of computing wheels, of a single set of computation-determining elements, a plurality of sets of actuating elements, one set individual to each set of computing wheels, and controlled in the extent of their movement by said computation-determining elements, means for simultaneously operating all of said actuating elements, to run up at the same time all of the digits of a number to be computed, and means for causing any of said sets of actuating elements during such operation to selectively rotate the associated computing wheels either backwardly or forwardly, or move idly without rotating the associated computing wheels, independently of the action of the other sets of actuating elements.

62. The combination with a computing mechanism, of a drive for said computing mechanism, zeroizing mechanism for said computing mechanism, and means actuated at the actuation of said zeroizing mechanism for neutralizing said drive.

63. The combination with a computing mechanism, of a drive for said computing mechanism, zeroizing mechanism for said computing mechanism, and means for silencing said drive at the actuation of said zeroizing mechanism.

64. The combination with a computing mechanism, of a drive for said computing mechanism capable of driving said computing mechanism in either direction, zeroizing mechanism for said computing mechanism, and neutralizing mechanism actuated by said zeroizing mechanism for silencing said drive in either state of driving action so as to prevent the interference of the driving action with the zeroizing action.

65. The combination with a computing mechanism, of a zeroizing mechanism for said computing mechanism, an effective connection normally extant between said zeroizing mechanism and said computing mechanism, and means for varying the drive to said computing mechanism acting at times to disturb the normal relation between said zeroizing mechanism and said computing mechanism, and brought into play at the actuation of said zeroizing mechanism for insuring the existence of said computing mechanism and said zeroizing mechanism in a normal relation during a zeroizing action.

66. The combination with a computing head, of a finger-piece for controlling the state of said computing head as to adding and subtracting, a zero key zeroizing said computing head, and means operated by said zero key for returning said finger-piece to a neutral position corresponding to the passive state of said computing head.

67. The combination with a series of computing wheels, of a zero key, means coöperating with said zero key for returning said wheels to zero, actuating means for rotating said computing wheels in either direction, a finger-piece for controlling the direction in which said computing wheels shall be rotated by said actuating means, and a V-shaped cam operated by said zero key for moving said finger-piece to a mid-position corresponding to the interruption of the drive between said computing wheels and said actuating means.

68. The combination, with a computing mechanism including a plurality of computing wheels; of tens-carrying mechanism for said computing wheels; a general operator; and means for effecting, during a single stroke of the general operator in one direction, a complete rotation of part of the tens-carrying mechanism in one direction, and reversal and rotation of the remaining part of said tens-carrying mechanism in the opposite direction, said tens-carrying mechanism as a whole being silent during the opposite stroke of said general operator.

69. The combination with a plurality of sets of dial wheels, of a plurality of sets of denominational members for driving said dial wheels, there being one set of denominational members for each set of said dial wheels, a general operator for shifting said denominational members into driving relation with said dial wheels, and for driving said denominational members to drive said dial wheels, and state-controlling means for selectively determining which set of said denominational members shall be shifted into engagement with its set of dial wheels.

70. The combination with a plurality of sets of dial wheels, of a plurality of sets of denominational members for driving said dial wheels, there being one set of denominational members for each set of said dial wheels, a general operator for shifting said denominational members into driving relation with said dial wheels, and for driving said denominational members to drive said dial wheels, state-controlling means for selectively determining which set of said denominational members shall be shifted into engagement with its set of dial wheels, and means for delaying the drive of said denominational members by said general operator until the denominational members to be active have been shifted into effective engagement with the corresponding dial wheels.

71. The combination with a plurality of dial wheels, of a plurality of sets of denominational members for driving said dial wheels, there being one denominational member for each dial wheel, and one set of denominational members for each set of dial wheels, a general operator for shifting said denominational members into effective driving relation with said dial wheels, and for driving said denominational members to drive said dial wheels, said denominational members being loosely joined in groups of the same denomination, so that denominational members of the same denomination may be driven in unison by said general operator, and shifting means for selectively manipulating denominational members of the same group relatively to each other, so as to determine their activity and character of activity.

72. The combination with a plurality of sets of dial wheels, of a plurality of sets of denominational members for driving said dial wheels, there being one denominational member for each of said dial wheels, and one set of denominational members for each set of dial wheels, the denominational members of the different sets being loosely united in groups of the same denomination, so that denominational members of the same denomination may be driven in unison, a general operator for shifting said denominational members into effective driving relation with respect to said dial wheels, and for driving said denominational members to drive said dial wheels, each of said denominational members comprising a double rack arranged to drive the associated dial wheel in opposite directions according to which portion of said rack is in engagement therewith, and shifting means operated by said general operator, selectively settable to determine the effectiveness and the character of activity of the several sets of denominational members, whereby the sets of dial wheels in action will be selected and the character of computation carried on thereby will be determined.

73. The combination with a plurality of sets of dial wheels, of a plurality of sets of denominational members for driving said dial wheels, there being one denominational member for each dial wheel, and one set of denominational members for each set of dial wheels, said denominational members being pivotally connected in groups of the same denomination, so as to be movable relatively to each other, whereby while denominational members of the same group may move in unison the same amount, their effect on their associated dial wheels may be different, and selecting means for shifting the sets of denominational members relatively to the other denominational members in the several groups, so as to determine the character of computation carried on by the associated sets of dial wheels.

74. The combination with a plurality of sets of dial wheels, of a plurality of sets of denominational members for driving said dial wheels, there being one denominational member for each dial wheel, and one set of denominational members for each set of dial wheels, said denominational members being pivotally connected in groups of the same denomination, so as to be movable relatively to each other, whereby while denominational members of the same group may move in unison the same amount, their effect on their associated dial wheels may be different, selecting means for shifting the seats of denominational members relatively to the other denominational members in the several groups, so as to determine the character of computation carried on by the associated sets of dial wheels, and a general operator for actuating said slecting means after having been set, so as to enable the shifting of said denominational members into effective relation with respect to said dial wheels, and for driving said denominational members to drive said dial wheels.

75. The combination with a plurality of sets of dial wheels, of a plurality of sets of denominational members for driving said dial wheels, there being one denominational member for each dial wheel, and one set of denominational members for each set of dial wheels, said denominational members being pivotally connected in groups of the same denomination, so as to be movable relatively to each other, whereby while denominational members of the same group may move in unison the same amount, their effect on their associated dial wheels may be different, selecting means for shifting the sets of denominational members relatively to the other denominational members in the several groups, so as to determine the character of computation carried on by the associated sets of dial wheels, a general operator for actuating said selecting means after having been set, so as to enable the shifting of said denominational members into effective relation with respect to said dial wheels, and for driving said denominational members to drive said dial wheels, and means for delaying the drive of said denominational members by said general operator until said denominational members have been shifted into bers to drive said dial wheels.

76. The combination with a plurality of sets of dial wheels, of a gear secured to each of said dial wheels, a plurality of sets of denominational members for driving said dial wheels, there being one set of denominational members for each set of dial wheels, and one denominational member for each dial wheel, each of said denominational members comprising a double rack bar embracing the gear of the associated dial wheel, and having rack portions arranged to engage such gear on opposite sides thereof, so as to drive the associated dial wheel selectively in opposite directions, and connecting means for loosely joining said rack bars in groups of the same denomination, so as to be driven the same extent, and yet shiftable so as to be selectively operative and in the same sense or in different senses.

77. The combination with a plurality of computing heads, each comprising a plurality of computing wheels, the computing wheels of one head being located interjacent the computing wheels of another head, a plurality of sets of denominational members, one set for each head, the denominational members of the different sets being located interjacent each other, connecting means for joining denominational members of the different sets of the same denomination in groups so as to move in unison, said denominational members being normally out of engagement with said computing wheels, and means for simultaneously shifting all of said denominational members into engagement with said computing wheels, so as to drive said computing wheels, and run up numbers in all of said computing wheels at the same time.

78. The combination with a plurality of computing heads, each comprising a plurality of computing wheels, the computing wheels of one head being located interjacent the computing wheels of another head, of a plurality of sets of denominational members, one set for each head, the denominational members of the different sets being located interjacent each other, connecting means for joining denominational members of the different sets of the same denomination in groups, so as to move in unison, said denominational members being normally out of engagement with said computing wheels, means for simultaneously shifting all of said denominational members into engagement with said computing wheels, so as to drive said computing wheels and run up numbers in all said computing wheels at the same time, and means for selectively determining whether denominational members in the same group shall drive their associated computing wheels in the same or opposite directions.

79. The combination with a series of computing wheels, of a series of quadriplex denominational members for driving said computing wheels, each denominational member being individual to a pair of computing wheels, and arranged to drive computing wheels of each pair the same amount in the same direction or in opposite directions.

80. The combination with a series of computing wheels, of a series of actuating members for said computing wheels, said actuating members being normally disconnected from driving relation with said computing wheels, shifting mechanism for moving each set of said actuating members into driving relation with the corresponding set of computing wheels, a general operator for driving said actuating members, interponent mechanism enabling said general operator to actuate any or all of said shifting mechanisms, and selecting means for determining which of said shifting mechanisms will be operated by said general operator.

81. The combination with a plurality of sets of computing wheels, of a plurality of sets of actuating members for said computing wheels, said actuating members being normally disconnected from driving relation with said computing wheels, shifting mechanism for moving each set of said actuating members into driving relation with the corresponding set of computing wheels, a general operator for driving said actuating members, interponent mechanism enabling said general operator to actuate any or all of said shifting mechanisms, and selecting means individual to each of said shifting mechanisms for determining the character of shifting action of said shifting mechanisms by said interponent mechanism so as to determine the character of computation of the associated set of computing wheels.

82. The combination with a plurality of sets of computing wheels, of a single set of duplex rack bars arranged to rotate each set of computing wheels alternatively in opposite directions to either add or subtract, said rack bars being joined in groups of the same denomination, so as to be capable of driving computing wheels of different sets at the same time.

83. The combination with a plurality of computing wheels of the same denomination, of a plurality of rack bars of the same denomination joined so as to drive in unison, each of said rack bars having a plurality of racks arranged to rotate its associated computing wheel in opposite directions.

84. The combination with a plurality of computing wheels of the same denomination, of a plurality of rack bars of the same denomination, joined so as to drive in unison, each of said rack bars having a plurality of racks arranged to rotate its associated computing wheel in opposite directions, and shifting means for selectively adjusting the individual rack bars relatively to each other, so as to bring one or the other of the racks thereon into engagement with the associated computing wheel irrespective of the character of engagement of each other, so that rack bars of the same denomination may drive their computing wheels simultaneously in the same direction or in opposite directions, or not at all, the same extent.

85. The combination with a plurality of sets of computing wheels, of a plurality of multiplex racks, and means to move said racks to actuate a plurality of sets of said computing wheels consentaneously for computing wheels of the same denomination in the sets, in opposite directions.

86. In a combined typewriting and computing machine, the combination of a plurality of computing heads; numeral keys; a traveling carriage; a single set of indexing devices under joint control of said carriage and keys; a general operator; and means for causing the general operator to carry the number set up on said indexing devices simultaneously into all of said computing heads.

87. In a combined typewriting and computing machine, the combination of a plurality of computing heads; a carriage movable step by step; a single set of denomination-selecting devices brought into action by the carriage movement; and means for enabling said single set of denomination-selecting devices to simultaneously control the operation of a plurality of said computing heads.

BURNHAM C. STICKNEY.

Witnesses:
C. RIPLEY,
C. NEWELL.